US012254730B2

(12) United States Patent
Lai et al.

(10) Patent No.: US 12,254,730 B2
(45) Date of Patent: Mar. 18, 2025

(54) SYSTEM OF ELECTRONIC LOCK AND ELECTRONIC KEY

(71) Applicant: TEAM YOUNG TECHNOLOGY CO., LTD., Taoyuan (TW)

(72) Inventors: Chien-Chou Lai, Taoyuan (TW); Dy-Cheng Wang, Taoyuan (TW)

(73) Assignee: TEAM YOUNG TECHNOLOGY CO., LTD., Taoyuan (TW)

( * ) Notice: Subject to any disclaimer, the term of this patent is extended or adjusted under 35 U.S.C. 154(b) by 34 days.

(21) Appl. No.: 18/031,605

(22) PCT Filed: Dec. 21, 2021

(86) PCT No.: PCT/CN2021/140231
§ 371 (c)(1),
(2) Date: Apr. 12, 2023

(87) PCT Pub. No.: WO2022/135423
PCT Pub. Date: Jun. 30, 2022

(65) Prior Publication Data

US 2023/0386281 A1 Nov. 30, 2023

(30) Foreign Application Priority Data

Dec. 24, 2020 (CN) ........................ 202011552270.5

(51) Int. Cl.
*G07C 9/00* (2020.01)

(52) U.S. Cl.
CPC ..... *G07C 9/00817* (2013.01); *G07C 9/00309* (2013.01); *G07C 2009/00642* (2013.01)

(58) Field of Classification Search
CPC ........... G07C 9/00817; G07C 9/00309; G07C 2009/00642; G07C 9/33; G07C 9/00571;
(Continued)

(56) References Cited

U.S. PATENT DOCUMENTS

2008/0196458 A1* 8/2008 Lu ....................... E05B 47/0012 70/257
2011/0174029 A1 7/2011 Lappalainen et al.
(Continued)

FOREIGN PATENT DOCUMENTS

CN 101075357 11/2007
CN 201794393 4/2011
(Continued)

OTHER PUBLICATIONS

"International Search Report (Form PCT/ISA/210) of PCT/CN2021/140231", mailed on Mar. 22, 2022, with English translation thereof, pp. 1-6.
(Continued)

*Primary Examiner* — Sisay Yacob
(74) *Attorney, Agent, or Firm* — JCIPRNET

(57) ABSTRACT

A system (1) of an electronic lock (3) and an electronic key (2). The system comprises an electronic key (2) and an electronic lock (3), wherein the electronic key (2) comprises a first processing module (22), a first storage module (23), a power source module (21) and a first terminal (24); the electronic lock (3) comprises a second processing module (32), a second storage module (33), a lock core module (31) and a second terminal (34); when the electronic key (2) and the electronic lock (3) are set in a pairing manner, the first terminal (24) is electrically connected to the second terminal (34), the first processing module (22) or the second processing module (32) automatically generates at least one electronic secret key, and the at least one electronic secret key is stored in the first storage module (23) and the second storage module (33), so that a pairing action is completed; and when locking or unlocking is carried out, the first terminal (24) is electrically connected to the second terminal (34), and when the first processing module (22) or the second processing module (32) identifies that the electronic key (2) and the at
(Continued)

least one electronic secret key stored in the electronic lock (3) match with each other, the power source module (21) supplies a power source to the connected electronic lock (3), so as to trigger a locking or unlocking action.

10 Claims, 3 Drawing Sheets

(58) Field of Classification Search
CPC ........... G07C 2009/00388; G07C 2009/00753; G07C 2009/00769; E05B 47/0001
See application file for complete search history.

(56) References Cited

U.S. PATENT DOCUMENTS

2012/0114122 A1* 5/2012 Metivier ............ G07C 9/00817 380/247
2018/0211456 A1 7/2018 Hart et al.

FOREIGN PATENT DOCUMENTS

CN 202280297 6/2012
CN 102654002 9/2012
CN 202870952 4/2013
CN 103745513 4/2014
CN 203520493 4/2014
CN 105552036 5/2016
CN 107680212 2/2018
CN 207714939 8/2018
CN 108877010 11/2018
CN 111091639 5/2020
CN 211818740 10/2020
EP 0635182 3/2003
TW I731830 6/2021
WO 2020051910 3/2020
WO WO-2020051910 A1 * 3/2020 ......... G06Q 20/3829

OTHER PUBLICATIONS

"Search Report of Europe Counterpart Application", issued on Oct. 11, 2024, p. 1-p. 7.

* cited by examiner

SYSTEM OF ELECTRONIC LOCK AND ELECTRONIC KEY

BACKGROUND

Technical Field

The invention relates to a system of an electronic lock and an electronic key, and particularly relates to an electronic lock without a power source, and an electronic key that transmits a power source to the electronic lock to trigger locking or unlocking operations by matching and comparing of pairing setting information.

Description of Related Art

Conventional locks require corresponding physical metal keys for opening. In daily life, conventional locks exist everywhere, such as home door locks, automobile and motorcycle locks, company access control locks, drawer locks, etc. In order to implement locking or unlocking, it is necessary to carry a large number of keys, and a shape and a size of each key are usually different, and the number of keys is very large. When carrying or keeping the keys, regardless of whether the keys are placed in a pocket or a purse, they are quite difficult to organize, and occupy a lot of space and are bulky. Also, it is easy to lose the keys or forget to carry them when going outdoor, which often causes troubles for users in locking or unlocking operations.

The conventional lock generally includes various components such as a lock pin, a slider, a shaft, a cam, etc. When the physical metal key is inserted into a key hole of a lock core, rotation of the metal key drives the shaft to rotate, and the cam on the shaft rotates to push the slider, and then the slider pushes the lock pin to achieve locking of the lock. Since the conventional lock contains many components, and the components have complex connection relationships, complicated processes are required during production. After each component is produced, the components are then assembled one by one, which consumes a lot of manpower, assembling time and manufacturing cost thereof is rather high, resulting in high prices of the locks.

In terms of design of commercially available electronic locks, the electronic locks usually require computer assistance for setting, and an existing password encryption technology requires a secret key for implementing encryption. In order to increase the difficulty of encryption, the secret key with more bytes is usually used for encryption, or uniqueness of biometrics is used as a verification condition for prevention from being cracked by intentional people. The secret key with more bytes requires a processor with better performance to perform calculations and requires more storage space, while biometric identification requires a special verification module, thereby increasing the cost of hardware design.

In order to mitigate the above-mentioned defects of various existing conventional locks, the invention designs a system of an electronic lock and an electronic key to solve the defects of the prior art, in particular, it is necessary to propose improvements on key points such as setting of electronic secret keys to be paired and locking or unlocking identification operations, resolving the convenience problem of carrying and keeping a large number of keys, the security between keys and locks, reliability of the locks, cost reduction, etc.

SUMMARY

The invention provides a system of an electronic lock and an electronic key, where the electronic key and the electronic lock are adapted to automatically bind the pairing setting after being connected without the need for setting through a computer, thereby improving setting convenience of users.

Another feature of the invention is that when the electronic key and the electronic lock bind the pairing setting, an electronic secret key is adapted to be automatically generated based on a random number, and no one can peep and know the electronic secret key, so as to improve security of the system of an electronic lock and an electronic key.

Another feature of the invention is that the electronic key may automatically bind the pairing settings with up to hundreds or more electronic locks, and locking and unlocking may be implemented after physical connection, where a user does not need to memorize the electronic secret key, and does not need to keep or mark a large number of keys, thereby simplifying and improving user's operation practicality.

Another feature of the invention is that the electronic lock itself does not contain a power source and the electronic key supplies a power source for operation, so as to improve the reliability and a safety rate of the system of an electronic lock and an electronic key.

Another feature of the invention is to replace a conventional driving motor with a shape memory alloy wire to reduce the manufacturing cost of the system of an electronic lock and an electronic key.

In order to achieve the above purposes, a system of an electronic lock and an electronic key disclosed by the invention includes: an electronic key, including: a first processing module, a first storage module, a power source module, and a first terminal, where the first processing module is electrically connected to the first storage module, the power source module, and the first terminal; and an electronic lock, including: a second processing module, a second storage module, a lock core module, and a second terminal, where the second processing module is electrically connected to the second storage module, the lock core module, and the second terminal; where during pairing setting of the electronic key and the electronic lock, the first terminal is electrically connected to the second terminal, the first processing module or the second processing module automatically generates at least one electronic secret key, and the at least one electronic secret key is stored in the first storage module and the second storage module to complete a pairing setting operation; and during locking or unlocking, the first terminal is electrically connected to the second terminal, and when the first processing module or the second processing module identifies that the at least one electronic secret key stored in the electronic key and the electronic lock are matched with each other, the power source module supplies a power source to the connected electronic lock being connected to trigger a locking operation or an unlocking operation.

Further, in order to achieve the above purposes, in the system of an electronic lock and an electronic key of the invention, the first storage module stores an erasing secret key, and during pairing setting, the erasing secret key is copied and stored in the second storage module.

Further, in order to achieve the above purposes, in the system of an electronic lock and an electronic key of the invention, the electronic lock is a shape memory alloy lock, and the lock core module includes a shape memory alloy unit, and the shape memory alloy unit includes at least one metal alloy having a shape reversibly changeable within a specific temperature range.

Further, in order to achieve the above purposes, in the system of an electronic lock and an electronic key of the invention, the electronic key is adapted to repeatedly perform the pairing setting operation with a plurality of the electronic locks, and store a plurality of the at least one electronic secret key automatically generated during the pairing setting operation with the plurality of electronic locks.

Further, in order to achieve the above purposes, the system of an electronic lock and an electronic key of the invention further includes an editing management device. The editing management device is used to set, delete, or modify the erasing secret key or the at least one electronic secret key stored in the electronic key or the electronic lock.

Further, in order to achieve the above purposes, in the system of an electronic lock and an electronic key of the invention, the editing management device has the same erasing secret key as the electronic key or the electronic lock.

Further, in order to achieve the above purposes, in the system of an electronic lock and an electronic key of the invention, the at least one electronic secret key is at least a pair of random numbers.

Further, in order to achieve the above purposes, in the system of an electronic lock and an electronic key of the invention, when the first terminal is electrically connected to the second terminal, and the first processing module or the second processing module identifies that the erasing secret keys of the electronic key and the electronic lock are the same, the first processing module or the second processing module deletes or modifies the erasing secret key and the at least one electronic secret key stored in the electronic lock.

Further, in order to achieve the above purposes, the system of an electronic lock and an electronic key of the invention further includes a slave electronic key, and when the electronic key is electrically connected to the slave electronic key, all of or a part of the stored at least one electronic secret key in the electronic key is stored to the slave electronic key.

Further, in order to achieve the above purposes, in the system of an electronic lock and an electronic key of the invention, when the electronic key is also a slave electronic key of another electronic key, only all of or a part of the stored at least one electronic secret key bound corresponding to the erasing secret key in the electronic key is stored to the slave electronic key.

Further, in order to achieve the above purposes, in the system of an electronic lock and an electronic key of the invention, the electronic key further includes a start button used to wake up the first processing module, and the first processing module enters a sleep state after completing a deletion operation, an erasing secret key setting operation, an authorization operation, the pairing setting operation, the locking operation, or the unlocking operation.

In order to make the aforementioned features and advantages of the invention easier to understand, the following describes in detail the exemplary embodiments with the accompanying drawings. It is to be understood that both the foregoing general description and the following detailed description are exemplary and are intended to provide further explanation of the invention as claimed.

The detailed structure, features, assembly or usage of the system of an electronic lock and an electronic key disclosed in the invention will be described in detail in the following implementations. However, those with ordinary skills in the field of the invention should be able to understand that the detailed description and the specific examples enumerated for implementing the invention are only for illustrating the invention, and are not intended to limit the technical solution of the invention.

DESCRIPTION OF THE EMBODIMENTS

Figure 1:
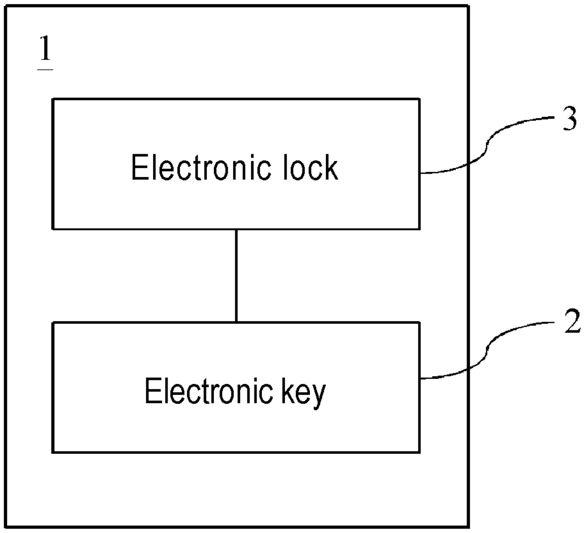
FIG. 1 is a schematic diagram of a system of an electronic lock and an electronic key according to an embodiment of the invention.

Referring to FIG. 1, a system of an electronic lock and an electronic key 1 includes an electronic key 2 and an electronic lock 3, where when the electronic key 2 is connected and paired with the electronic lock 3, pairing setting information is respectively stored in the electronic key 2 and the electronic lock 3 to complete the pairing setting operation. Then, the electronic key 2 is connected to the electronic lock to be locked or unlocked, and if the pairing setting information is identified as matching each other, locking or unlocking is conducted, where the pairing setting information includes at least one electronic secret key, or in a mechanism adapted to verify an erasing secret key, the pairing setting information includes the erasing secret key and the at least one electronic secret key.

Figure 2:
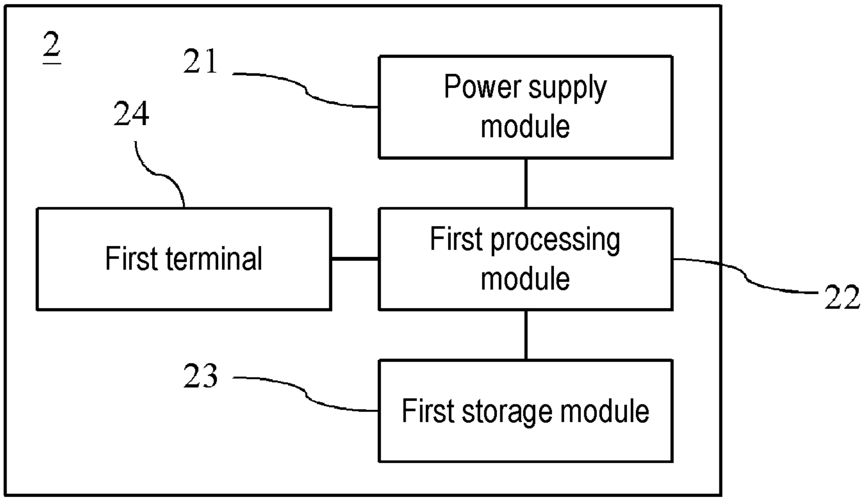
FIG. 2 is a schematic diagram of an electronic key according to an embodiment of the invention.

Referring to FIG. 2, the electronic key 2 is a handheld device, such as a mobile phone, a remote controller, a key ring, or a USB flash drive and other types of devices, where the electronic key 2 includes a first processing module 22, a first storage module 23, a power source module 21 and a first terminal 24, where the first processing module 22 is respectively electrically connected to the first storage module 23, the power source module 21 and the first terminal 24, and the first storage module 23 may selectively store the at least one electronic secret key or erasing secret key according to different functional requirements.

The first processing module 22 is a computing core of the electronic key 2, and it is possible to be selectively set to automatically generate the at least one electronic secret key by the first processing module 22. The pairing setting information may include the at least one electronic secret key, or in the mechanism of verifying the erasing secret key, the pairing setting information may include the erasing secret key and the at least one electronic secret key. The first processing module 22 may be, for example but not limited to, a micro control unit (MCU) or a module composed of various active and passive components. The first processing module 22 includes a central processing unit (not shown), a memory unit (not shown), a timing unit (not shown), various input and output interfaces (not shown), etc. In an embodiment of the invention, the first processing module 22 is equivalent to a variety of units integrated in an integrated circuit, and since multiple units are miniaturized and integrated in the integrated circuit, a volume of the first processing module 22 is reduced, and it is convenient to be arranged in the electronic key 2, which is of better help to the use of space, so that an appearance and size of the electronic key 2 may be designed in a miniaturized manner. The first processing module 22 is connected to a second terminal 34 through the first terminal 24 to serially or parallelly transmit a state signal, the pairing setting information, a locking instruction or an unlocking instruction, and it is selectively set to identify whether the pairing setting information transmitted by the second processing module 32 is matched with the at least one electronic secret key stored in the electronic key 2 by the first processing module 22, so as to determine whether to send the locking instruction or the unlocking instruction to the second processing module 32 to perform a corresponding locking operation or unlocking operation, where the state signal is that when the first terminal 24 is connected to the second terminal 34, it is used to identify whether the electronic key 2 or the electronic lock 3 is in the state of binding pairing setting or unbinding pairing setting, so as to determine whether to perform the pairing setting operation after connection or identifies the corresponding locking operation or unlocking operation as the pairing setting information matches. If the electronic key 2 or the electronic lock 3 stores the pairing setting information of the at least one electronic secret key, then the electronic key 2 or the electronic lock 3 is in the state of binding pairing setting; and if the electronic key 2 or the electronic lock 3 does not store the pairing setting information of the at least one electronic secret key, the electronic key 2 or the electronic lock 3 is in the state of unbinding pairing setting.

In addition, when the first terminals 24 of different electronic keys are connected to each other, the state signal or an authorization operation are serially or parallelly transmitted, where the state signal is that when the first terminal 24 is connected to another first terminal 24, the first processing module 22 of the electronic key 2 identifies whether the electronic key 2 is in the state of binding pairing setting or unbinding pairing setting, so as to determine the authorization operation to be performed after connection. If the electronic key 2 stores the pairing setting information of the at least one electronic secret key, the electronic key 2 is in the state of binding pairing setting; and if the electronic key 2 does not store the pairing setting information of the at least one electronic secret key, the electronic key 2 is in the state of unbinding pairing setting.

The first storage module 23 is, for example, a storage device such as a memory, a hard disk, etc. The first storage module 23 is used to store the pairing setting information of each electronic lock 3. When the electronic lock 3 has not been connected and paired with the electronic key 2, there is no pairing setting information in the second storage module 33. After the electronic key 2 is connected and paired with the electronic lock 3, the second storage module 33 stores the pairing setting information, where the pairing setting information may include the at least one electronic secret key, or in the mechanism adapted to verify an erasing secret key, the pairing setting information includes the erasing secret key and the at least one electronic secret key.

The power source module 21 is a rechargeable battery or a replaceable battery. The power source module 21 is electrically connected to the first processing module 22, the first storage module 23 and the first terminal 24 in a direct or indirect manner, and provides electric energy required by the first processing module 22, the first storage module 23 and the first terminal 24, the indirect electrical connection refers to providing electric energy to the first storage module 23 and the first terminal 24 through the first processing module 22. The electronic key 2 further includes a warning module (not shown in the figure), such as an LED display light, a buzzer or a vibration unit, where the first processing module 22 generates a warning signal when detecting that the power of the power source module 21 is lower than a preset value, where the warning signal is, for example, a vibration warning, a sound warning, a flash light warning or at least one of the above warning methods. The electronic key 2 reminds the user to replace the battery or charge the battery as soon as possible through the warning signal, which may effectively avoid the dilemma of being unable to perform locking or unlocking.

The electronic key 2 may optionally adopt a sleep state to save power or not choose to save power. For example, the electronic key 2 may enter the sleep state when it is idle. For example, if the electronic key 2 is not used for several minutes, it starts to enter the sleep state to reduce power consumption of the power source module 21, when the electronic key 2 receives a trigger signal as it is in the sleep state, the electronic key 2 may be woken up. For example, the electronic key 2 may further include at least one button, where the at least one button includes a start button, when the start button is pressed, a trigger signal is generated to wake up the first processing module 22, and the first processing module 22 enters the sleep state after completing a deleting operation, an erasing secret key setting operation, an authorization operation, a pairing setting operation, a locking operation or an unlocking operation, where the deleting operation is to delete the erasing secret key or the at least one electronic secret key stored in the electronic key 2 or the electronic lock 3; the erasing secret key setting operation is to set and store the erasing secret key in the electronic key 2. For another example, when the electronic key 2 is in the sleep state, when the electronic key 2 is connected to the electronic lock 3, the electronic key 2 and the electronic lock 3 generate a trigger signal at the moment of connection, so as to wake up the first processing module 22 to make the electronic key 2 resuming a working state. The design of the sleep state may effectively prolong a use time of the electronic key 2, reduce a replacement frequency of the power source module 21 or reduce a charging frequency of the power source module 21, but the invention is not limited to the sleep state.

The first terminal 24 is a connection interface of the electronic key 2, the first terminal 24 transmits signals and provides electric energy to the electronic lock 3 through a transmission line, the first processing module 22 communicates with the electronic lock 3 through the first terminal 24, and the power source module 21 provides electric energy to the electronic lock 3 through the first terminal 24, so that the electronic lock 3 operates by using the electric energy of the power source module 21, where the first terminal 24, for example, adopts USB, Thunderbolt, RS-232 or a self-developed hardware specification.

Figure 3:
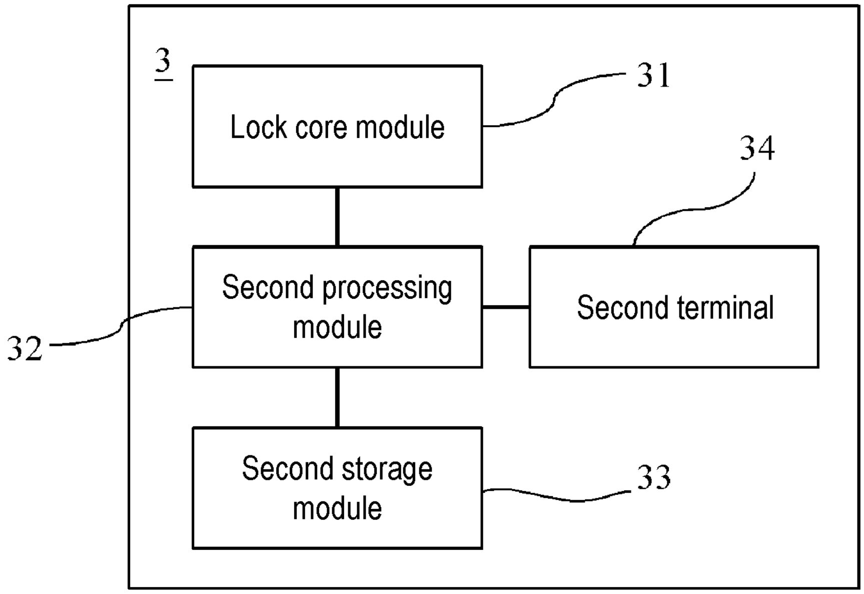
FIG. 3 is a schematic diagram of an electronic lock according to an embodiment of the invention.

Referring to FIG. 3, the electronic lock 3 includes: a second processing module 32, a second storage module 33, a lock core module 31 and a second terminal 34, where the second processing module 32 is electrically connected to the second storage module 33, the lock core module 31 and the second terminal 34, where the power source required by the electronic lock 3 is provided by the external electronic key 2, so that it is unnecessary to worry about a problem of insufficient power, and environmental resistance of the electronic lock 3 is improved. The electronic lock 3 is, for example, but not limited to a bicycle lock, a window lock, a padlock, a luggage lock, a drawer lock, etc., and the electronic lock 3 of the invention may be used as long as there is a mechanism that needs to be locked.

The second processing module 32 is a computing core of the electronic lock 3, and it is possible to be selectively set to automatically generate the at least one electronic secret key by the second processing module 32. The pairing setting information may include the at least one electronic secret key, or in the mechanism of verifying the erasing secret key, the pairing setting information may include the erasing secret key and the at least one electronic secret key. The second processing module 32 has the same structure as the above-mentioned first processing module 22, and detail thereof is not repeated. The second processing module 32 communicates with the first terminal 24 through the second terminal 34 to serially or parallelly transmit the state signal, the pairing setting information, and it is selectively set to identify whether the pairing setting information transmitted by the first processing module 22 is matched with the at least one electronic secret key stored in the electronic lock 3 by the second processing module 32, so as to determine whether to perform the corresponding locking operation or unlocking operation, where the state signal is that when the first terminal is connected to the second terminal 34, it identifies whether the electronic key 2 or the electronic lock 3 is in the state of binding pairing setting or unbinding pairing setting, so as to determine whether to perform the pairing setting operation after connection or identify the corresponding locking operation or unlocking operation as the pairing setting information matches.

The second storage module 33 is, for example, a storage device such as a memory, a hard disk, etc. The second storage module 33 is used to store the pairing setting information. The pairing setting information may include the at least one electronic secret key, or in the mechanism of verifying the erasing secret key, the pairing setting information may include the erasing secret key and the at least one electronic secret key. When the electronic lock 3 has not been connected and paired with the electronic key 2, the at least one electronic secret key in the pairing setting information does not exist in the second storage module 33. After the electronic key 2 is connected and paired with the electronic lock 3, the second storage module 33 stores the pairing setting information.

The electronic lock 3 is a memory alloy lock, and the lock core module 31 includes a shape memory alloy (SMA) unit (not shown) and a latch unit (not shown). The SMA unit includes at least one metal alloy with a shape that is reversibly changeable within a specific temperature range, and the SMA unit in the lock core module 31 is connected to the latch unit. The latch unit is, for example, a lock pin or a combination of a lock pin and a linkage mechanism. The SMA and the latch unit are connected to each other and move between a locking position and an unlocking position to achieve a locking or unlocking function.

When a current flows through the SMA unit, heat energy is generated from electric energy, which increases a temperature of an alloy material of the SMA unit. When the temperature rises to a specific temperature range, the alloy material of the SMA unit deforms due to a phase change, and directly or indirectly pull the latch unit to move between the locking position and the unlocking position, so that the electronic lock 3 is locked or unlocked. The structure of the SMA unit of the lock core module is simple, which omits a design of a motor, so that an actuation design structure of the SMA unit and the latch unit is simple, the cost thereof is low, and the manufacturing process is simple. The lock core module 31 is internally driven as the SMA unit drives the latch unit, so that a damage caused by mechanical failure of the motor may be reduced, and the electronic lock has better reliability and safety rate. Due to the above characteristics, the SMA unit may replace the complex structural design of the conventional locks. Utilize the shape change of the SMA unit by temperature change, to drive the displacement of the latch unit between the locking position and the unlocking position and to complete the locking or unlocking operation, but the locking operation or unlocking operation of the electronic lock 3 of the invention is not limited thereto.

The second terminal 34 is a connection interface of the electronic lock 3. The electronic key 2 and the electronic lock 3 are electrically connected to each other through a transmission line via the first terminal 24 and the second terminal 34 respectively, and transmit state signals, pairing setting information, and the locking instruction or unlocking instruction to each other. The electronic lock 3 itself does not have a power source, and through the connection between the second terminal 34 of the electronic lock 3 and the first terminal 24, the electric energy of the power source module 21 of the electronic key 2 is provided to the electronic lock 3, so that the electronic lock 3 uses the electric energy of the power source module 21 to run and operate, where the first terminal 24, for example, adopts USB, Thunderbolt, RS-232 or self-developed hardware specifications.

When the pairing setting information includes the at least one electronic secret key, the second storage module 33 does not have the pairing setting information of the electronic secret key if the electronic lock 3 has not yet been paired with any electronic key 2. By connecting the first terminal 24 of the electronic key 2 with the second terminal 34 of the electronic lock 3 to set the electronic secret key of the electronic lock 3. The power source module 21 transmits the electric energy of the power source module 21 to the electronic lock 3 through the connection between the first terminal 24 and the second terminal 34. The second processing module 32 performs signal transmission with the first processing module 22, and the first processing module 22 detects whether there is pairing setting information in the electronic lock 3. For example, the first processing module 22 may issue an inquiry instruction, and the second processing module 32 transmits a state signal to the first processing module 22 to determine whether the electronic lock 3 stores an electronic secret key. When the first processing module 22 receives the state signal, it determines to perform the pairing setting operation, the corresponding locking operation or unlocking operation.

When the pairing setting information includes at least one electronic secret key, the pairing setting operation is described as follows: the first terminal 24 is electrically connected to the second terminal 34, when the electronic key 2 and the electronic lock 3 are paired, the first processing module 22 communicates with the second processing module 32. When the electronic lock 3 does not have an electronic secret key, the first processing module 22 or the second processing module 32 automatically generates at least one random number as the at least one electronic secret key, and the first storage module 23 in the electronic key 2 and the second storage module 33 in the electronic lock 3 simultaneously store the aforementioned automatically generated pairing setting information including the at least one electronic secret key to complete the pairing setting operation without setting by a computer. In addition, the electronic key 2 may repeatedly perform the pairing setting operations with multiple electronic locks 3, and store a plurality of the at least one electronic secret key automatically generated by pairing with multiple electronic locks 3, where the at least one electronic secret key is a random number, at least one pair of random numbers or three or more random numbers. The at least one electronic secret key may be generated by the first processing module 22, the second processing module 32 or commonly generated by the first processing module 22 and the second processing module 32. The first processing module 22 and the second processing module 32 commonly generating the at least one electronic secret key is defined as that the first processing module 22 and the second processing module 32 respectively generate the at least one electronic secret key and store it in the first storage module 23 and the second storage module 33. Through mutual communication and identification, the at least one electronic secret key is generated by a random number, and no one can peep or know the content of the at least one electronic secret key, so that the at least one electronic secret key has high confidentiality.

The first storage module 23 of the electronic key 2 stores a plurality of pairing setting information bound with and corresponding to the multiple electronic locks 3, where the plurality of pairing setting information includes a plurality of the at least one electronic secret key, i.e., one electronic key 2 may unlock multiple electronic locks 3 through multiple electronic secret keys in the multiple pairing setting information stored in the first storage module 23. The electronic key 2 may automatically bind the pairing settings with up to hundreds or more locks, which solves the problem of carrying multiple one-to-one matched keys when opening multiple conventional locks, and greatly increases the convenience of users in locking or unlocking operations.

In addition, when the pairing setting information is set to include at least one electronic secret key, and the electronic key 2 authorizes another electronic key 2, for example, the at least one pairing setting information, i.e., all of or a part of the at least one electronic secret key bound with and corresponding to the at least one electronic lock 3 that is stored in the first storage module 23 of the electronic key 2 is stored to the another electronic key 2, the another electronic key 2 is defined as a slave electronic key. After authorization, all of or a part of the at least one electronic secret key of the electronic key 2 of an authorization source is added to the slave electronic key.

In the mechanism adapted to verify erasing secret key, each electronic key 2 may be set with a corresponding erasing secret key, for example, it may be preset before leaving the factory, and the erasing secret key is stored in the first storage module 23 through the first terminal 24. Before the electronic key 2 is connected to the electronic lock 3, the first storage module 23 only stores the erasing secret key, and the erasing secret key may be set to be associated with product information of the electronic key 2. For example, a production batch number may be used in calculation to obtain the erasing secret key, or specific digits of the production batch number may be taken as the erasing secret key, or an editing management device 4 is used to set or delete the erasing secret key. The editing management device 4 is connected to the first terminal 24 of the electronic key 2, and through the transmission of the first terminal 24, the same factory-set erasing secret key or a self-set erasing secret key of the electronic key 2 set and stored by the editing management device 4 may be downloaded and stored to the first storage module 23, so that each electronic key 2 may have the same or different erasing secret keys, where the erasing secret key is identification of pairing setting authority of the electronic key 2 and the electronic lock 3 and restriction of the authorization authority of the electronic key 2 to another electronic key 2.

Before the electronic lock 3 is paired with any electronic key 2, the second storage module 33 does not store the pairing setting information of the erasing secret key and the electronic secret key. The first terminal 24 of the electronic key 2 and the second terminal 34 of the electronic lock 3 are connected to set the pairing setting information of the erasing secret key or the at least one electronic secret key of the electronic lock 3. The power source module 21 transmits the electric energy of the power source module 21 to the electronic lock 3 through the connection between the first terminal 24 and the second terminal 34, and when the electronic lock 3 receives power, the second processing module 32 and the first processing module 22 perform signal transmission, and the first processing module 22 detects whether there is pairing setting information in the electronic lock 3. For example, the first processing module issues an inquiry instruction, and then the second processing module 32 transmits a state signal to the first processing module 22, where the state signal is that when the first terminal 24 is connected to the second terminal 34, it is used to identify whether the electronic lock 3 is in the state of binding pairing setting or unbinding pairing setting. If the electronic lock 3 stores the pairing setting information of the erasing secret key or the at least one electronic secret key, then the electronic lock 3 is in the state of binding pairing setting; and if the electronic lock 3 does not store the pairing setting information of the erasing secret key or the at least one electronic secret key, the electronic lock 3 is in the state of unbinding pairing setting. When receiving the state signal, the first processing module 22 determines whether to perform the pairing setting operation, the locking operation or the unlocking operation.

In the mechanism of verifying the erasing secret key, the pairing setting operation is described as follows: the first processing module 22 and the second processing module 32 are connected through the first terminal 24 and the second terminal 34, and after the first processing module 22 detects the signal indicating that the electronic lock 3 has not been paired, the first processing module 22 or the second processing module 32 automatically generates at least one random number to serve as at least one electronic secret key, and stores the at least one electronic secret key in the first storage module 23 and the second storage module 33, and stores the erasing secret key of the electronic key 2 in the second storage module 33, so that the second storage module 33 of the electronic lock 3 with the pairing setting completed has the pairing setting information of the erasing secret key and the at least one electronic secret key. When the electronic key 2 is sequentially connected to multiple electronic locks 3 that are not paired, the first processing module 22 or the second processing module 32 automatically generates a plurality of random numbers in sequence to serve as multiple pairing setting information, and the second storage module 33 of each electronic lock 3 stores the corresponding pairing setting information including the erasing secret key of the electronic key 2 and the at least one electronic secret key. The pairing setting information stored in the first storage module 23 of the electronic key 2 includes the erasing secret key of the electronic key 2 and a plurality of the at least one electronic secret key bound corresponding to the erasing secret key. The first storage module 23 stores a plurality of electronic secret keys corresponding to a plurality of electronic locks 3, i.e., one electronic key 2 may open a plurality of electronic locks 3 through the plurality of electronic secret keys stored in the first storage module 23. The electronic key 2 may automatically perform binding and pairing setting operations with the erasing secret key with up to hundreds or more locks, which solves the problem of carrying multiple one-to-one matched keys when opening multiple conventional locks, and greatly increases the convenience of users in locking or unlocking operations.

In the mechanism of verifying the erasing secret key, the erasing secret key may be designed to have at least 8 bytes according to actual requirements, and each byte has 8 bits, so that there are total 264 combinations of the erasing secret key. One of the functions of the erasing secret key is to control a control authority of the electronic key 2 and the electronic lock 3. The control authority includes the authority of the electronic key 2 to modify or delete the erasing secret key and the electronic secret key in the electronic lock 3. Another function of the erasing secret key is an authorization restriction of the electronic key 2 to another electronic key 2. For example, the electronic key 2 with the erasing secret key may authorize the ability of controlling locking or unlocking of the electronic lock 3 to another electronic key 2 through authorization. After the authorization, the another electronic key 2 may obtain all of or a part of the at least one electronic secret key bound corresponding to the erasing secret key of the electronic key 2 of the authorization source, but cannot obtain the same erasing secret key as the authorization source. Therefore, the authorized another electronic key 2 does not have the same erasing secret key as the electronic key 2 of the authorization source, i.e., cannot modify the electronic lock 3 that has the same erasing secret key as the electronic key 2 of the authorization source, nor authorize other electronic keys 2 to control the electronic lock 3 with the same erasing secret key as the electronic key 2 of the authorization source.

In the mechanism of verifying the erasing secret key, the electronic key 2 uses the erasing secret key as the distinction between a master electronic key 2 and the slave electronic key 2. After the electronic key 2 and the electronic lock 3 complete the pairing setting operation, the electronic key 2 and the electronic lock 3 both have the pairing setting information, which includes the same erasing secret key and at least one electronic secret key. When the electronic key 2 with the erasing secret key authorizes another electronic key 2, the electronic key 2 may only copy and store all of or a part of the same at least one electronic secret key bound corresponding to the erasing secret key to the another electronic key 2, and the erasing secret key is set to be unable to be copied. The electronic key 2 with the same erasing secret key as the electronic lock 3 is the master electronic key 2, and the another authorized electronic key 2 does not have the same erasing secret key as the electronic lock 3, and is defined as the slave electronic key 2 of the electronic lock 3. The slave electronic key 2 has the ability to control the electronic lock 3 that is authorized to bind all of or a part of at least one electronic secret key with the same erasing secret key, but does not have the ability to reauthorize the at least one electronic secret key bound corresponding to the same erasing secret key of the original authorizing electronic key 2 to another electronic key 2 and the ability to modify or delete the pairing setting information of the electronic lock that has the same erasing secret key as the original authorizing electronic key 2, since the erasing secret key is not copied to another electronic key 2 during authorization, the authority of authorization and modification or deleting of the electronic key 2 is managed through the erasing secret key.

The authorization operation of the electronic key 2 is described as follows: when the electronic key 2 is electrically connected to the slave electronic key 2, the electronic key 2 is connected to the first terminal 24 of another electronic key 2 through the first terminal 24, and the first processing module 22 of the electronic key 2 copies and stores all of or a part of at least one electronic secret key stored in the first storage module 23 to the first storage module 23 of the slave electronic key 2. In the embodiment, the first terminals 24 of the electronic key 2 and the slave electronic key 2 are connected to each other through a transmission line, but the invention is not limited thereto, and the electronic key 2 triggers the authorization operation automatically or by pressing at least one button after being connected. In the mechanism of verifying the erasing secret key, the electronic key 2 is connected to the first terminal 24 of another electronic key 2 through the first terminal 24, and the first processing module 22 of the electronic key 2 copies all of or a part of at least one electronic secret key bound corresponding to the erasing secret key in the first storage module 23 to the first storage module 23 of the slave electronic key 2, where the electronic key 2 may use at least one button to select the electronic lock 3 corresponding to all of or a part of the at least one electronic secret key bound corresponding to the erasing secret key to be authorized, so as to store all of or a part of the at least one electronic secret key to be authorized to the slave electronic key 2, and the procedures for backup and authorization of the electronic key 2 are simple and do not need to be set by a computer.

In the mechanism of verifying the erasing secret key, when the electronic key 2 is further a slave electronic key 2 of another electronic key 2, only the all of or a part of the at least one electronic secret key bound corresponding to the erasing secret key stored in the electronic key 2 is stored to the slave electronic key 2, where the erasing secret key binding is defined as that when the pairing setting operation of the electronic key 2 and the electronic lock 3 is performed, the same group of the at least one electronic secret key written into the first storage module 23 or the second storage module 33 and the written erasing secret key constitute a corresponding relationship, i.e., in the mechanism of verifying the erasing secret key, the at least one electronic secret key stored in the electronic key 2 during pairing setting will form a corresponding association with the stored erasing secret key, and the same erasing secret key binding in the electronic key 2 corresponds to at least one electronic secret key. When the electronic key 2 is further the slave electronic key 2 of another electronic key 2 at the same time, the first storage module 23 of the electronic key 2 includes at least one electronic secret key bound corresponding to the erasing secret key and at least one electronic secret key not bound by the erasing secret key, where the at least one electronic secret key bound corresponding to the erasing secret key has authority of authorizing the slave electronic key 2, and the at least one electronic secret key not bound by the at least one erasing secret key has no authority of authorizing other electronic keys 2. In the invention, only the electronic key 2 that stores the erasing secret key, which is, for example, set at the factory or reset by the editing management device, has the ability to authorize other slave electronic keys 2, and the electronic key 2 may select the electronic lock 3 with all of or a part of the same erasing secret key to be authorized by pressing at least one button, so as to store the corresponded all of or a part of the at least one electronic secret key to the slave electronic key 2. By using the design of the erasing secret key to manage the authority of authorization, the authority of the electronic lock 3 may be effectively controlled, and the excessive use of the authority of the electronic key 2 may be avoided.

The first processing module 22 of the electronic key 2 receives and stores multiple groups of electronic secret keys in the first storage module 23 during the authorization operation, if the same electronic secret key is detected, the first processing module 22 of the electronic key 2 does not repeatedly store the same electronic secret key in the first storage module 23, which may effectively save a storage space of the first storage module 23. When the storage space of the first storage module 23 is used up or is about to be used up, or when an electric power of the power source module 21 of the electronic key 2 is lower than a threshold value, the electronic key 2 generates a warning signal through a warning module (not shown in the figure). The warning signal is, for example, LED light flickering or a buzzer sound to remind the user to manually select to delete the electronic secret keys in the first storage module 23 or replace the battery, so as to maintain the normal use of the electronic key 2.

When the pairing setting information includes at least one electronic secret key, or in the mechanism of verifying the erasing secret key, the pairing setting information includes the erasing secret key and the at least one electronic secret key, and the electronic secret key is an identification basis for confirming locking or unlocking of the electronic lock 3. The electronic secret key is a random number generated by the first processing module 22 or the second processing module 32, and the random number is a design of at least 4 bytes, and each byte has 8 bits, so that there are total $2^{32}$ combinations of the random numbers. In other embodiments, if the random numbers are designed in groups of two random numbers, the number of combinations of the random numbers is as high as $2^{64}$, so that a repetition rate of the random numbers is quite low, which is not easy to be cracked, and has a very high security. Both of the electronic key 2 and the electronic lock 3 store the electronic secret keys. When the electronic secret keys of the electronic lock 3 and the electronic key 2 match each other, the first processing module 22 or the second processing module may automatically start or issue a locking instruction or an unlocking instruction to enable the power source module 21 to provide electric energy to the SMA unit in the lock core module 31, thereby driving the latch unit to operation, so as to lock or unlock the electronic lock 3. The invention does not require biometric identification and manual input of passwords, and has high security.

When the electronic key 2 locks or unlocks the electronic lock 3 subjected to pairing setting, the electronic key 2 and the electronic lock 3 are electrically connected through the first terminal 24 and the second terminal 34, and the first processing module or the second processing module 32 sends the pairing setting information. When the first processing module 22 or the second processing module 32 as a receiving end identifies that the pairing setting information matches with the at least one electronic secret key stored in the first storage module 23 or the second storage module 33, the power source module 21 supplies a power source to the lock core module 31 of the connected electronic lock 3 to trigger a corresponding locking operation or an unlocking operation. Matching of the at least one electronic secret key of the electronic key 2 and the electronic lock 3 is defined as that the electronic secret keys are the same or defined as the electronic secret keys are of the same group, where when the pairing setting information sent and received between the electronic key 2 and the electronic lock 3 has the same electronic secret key, it is determined to match each other; and when the pairing setting information is set to include at least two electronic secret keys of a same group, it is determined to match each other when the pairing setting information sent and received between the electronic key 2 and the electronic lock 3 has the same group of electronic secret keys; and when the pairing setting information is set to include at least one group of paired electronic secret keys, it is determined to match each other only when one of the paired electronic secret keys must be sent in sequence and the other one of the paired electronic secret keys must be correctly received in sequence between the electronic key 2 and the electronic lock 3.

When the first processing module 22 or the second processing module 32 between the electronic key 2 and the electronic lock 3 identifies that the at least one electronic secret key stored in the electronic key 2 and the electronic lock 3 matches each other, the locking or unlocking operation starts, which may automatically start the electronic lock 3 to transform from the original locking state to the unlocking state, or automatically start the electronic lock 3 to transform from the original unlocking state to the locking state. Alternatively, a locking instruction or an unlocking instruction may be transmitted between the electronic key 2 and the electronic lock 3. For example, when the at least one electronic secret key stored in the pairing setting information transmitted between the electronic key 2 and the electronic lock 3 matches each other, the second processing module 32 is automatically started or according to the locking instruction or unlocking instruction to energize and heat the SMA unit in the lock core module 31 through the electric energy provided by the power source module 21 of the electronic key 2, where when a temperature of the SMA unit rises, the SMA unit deforms, and accordingly drives the latch unit to move between the locking position and the unlocking position, so that the electronic lock 3 is locked or unlocked. After the electronic lock 3 is locked or unlocked, a locking completion signal or unlocking completion signal may be transmitted to the electronic key 2. After receiving the locking completion signal or unlocking completion signal, the electronic key 2 may remind the user that the electronic lock 3 is successfully locked or unlocked. When the at least one electronic secret key between the electronic key 2 and the electronic lock 3 does not match each other, the electronic lock 3 does not perform the locking operation or unlocking operation.

In an embodiment, when the pairing setting information between one electronic key 2 and one electronic lock 3 may be selectively set to include a single, multiple or paired electronic secret keys, in case of the single electronic secret key, the electronic key 2 and the electronic lock 3 are connected through the first terminal 24 and the second terminal 34, and the electronic key 2 supplies power to the electronic lock 3 and triggers the pairing setting operation. During the pairing setting operation, the first processing module 22 or the second processing module 32 generates an electronic secret key with a random number, and the electronic secret key is respectively stored in the first storage module 23 and the second storage module 33, and the erasing secret key is also copied from the first storage module 23 to the second storage module 33, so that both of the electronic key 2 and the electronic lock 3 have the electronic secret key and the erasing secret key. When the electronic key 2 intends to lock or unlock the electronic lock 3, through the connection between the first terminal 24 and the second terminal 34, the electric energy of the power source module 21 is provided to the electronic lock 3, and after the started electronic lock 3 and the electronic key 2 mutually verify that the pairing setting information is matched with each other, and the corresponding locking or unlocking operation is triggered. The first processing module 22 transmits the pairing setting information with the electronic secret key to the second processing module 32, and the second processing module 32 receives the pairing setting information, and determines whether it matches the electronic secret key in the second storage module 33, if they match each other, the corresponding locking operation or unlocking operation is started. The locking operation or unlocking operation may include the second processing module 32 energizing and heating the SMA unit in the lock core module 31. When the temperature of the SMA unit rises to a certain threshold, the SMA unit produces shrinkage deformation, thereby driving the latch unit to move between the locking position and the unlocking position, so that the electronic lock 3 achieves the locking or unlocking function. After the locking or unlocking operation is completed, the second processing module 32 returns a locking completion signal or an unlocking completion signal to the first processing module 22, and after receiving the locking completion signal or an unlocking completion signal, the first processing module 22 drives the display light of the electronic key 2 to flicker to serve as a locking or unlocking notification to the user. If the second processing module 32 receives the pairing setting information and determines that the pairing setting information does not match the electronic secret key in the second storage module 33, the electronic lock 3 does not perform the locking operation or the unlocking operation. Regarding the situation of one electronic key 2 and multiple electronic locks 3, the pairing setting operation, verification of the pairing setting information, and the locking operation or unlocking operation thereof are the same as those described above, and details thereof are not repeated here.

When the pairing setting information between one electronic key 2 and one electronic lock 3 may be selectively set to include a single, multiple or paired electronic secret keys, when the electronic key 2 intends to lock or unlock the electronic lock 3, through the connection between the first terminal 24 and the second terminal 34, the electric energy of the power source module 21 is provided to the electronic lock 3, and after the started electronic lock 3 and the electronic key 2 mutually verify that the pairing setting information is matched with each other, and the corresponding locking or unlocking operation is triggered. The second processing module 32 transmits the pairing setting information including the at least one electronic secret key to the first processing module 22, and the first processing module 22 receives the pairing setting information, and determines whether it matches the at least one electronic secret key stored in the first storage module 23, if they match each other, the first processing module 22 sends a locking instruction or an unlocking instruction to the second processing module 32. When the second processing module 32 receives the locking instruction, it starts the locking operation. When the second processing module 32 receives the unlocking instruction, it starts the unlocking operation. After the locking or unlocking operation is completed, the second processing module 32 returns a locking completion signal or an unlocking completion signal to the first processing module 22, and after receiving the locking completion signal or an unlocking completion signal, the first processing module 22 drives the display light of the electronic key 2 to flicker to serve as a locking or unlocking notification to the user. If the first processing module receives the pairing setting information and determines that the pairing setting information does not match the at least one electronic secret key stored in the first storage module 23, the electronic lock 3 does not perform the locking operation or the unlocking operation. Regarding the situation of one electronic key 2 and multiple electronic locks 3, the pairing setting operation, verification of the pairing setting information, and the locking operation or unlocking operation thereof are the same as those described above, and details thereof are not repeated here, where the electronic secret key is not limited to be single, multiple or paired, and a communication mode between the first processing module 22 and the second processing module 32 in the electronic key 2 and the electronic lock 3 is not limited to the above content, and the above description is only one of the embodiments, and cannot be used to limit the invention.

In other embodiments, when the electronic key 2 and the electronic lock 3 need to improve security, the pairing setting information setting may include using multiple groups of paired electronic secret keys as a judgment condition, and by verifying multiple groups of paired electronic secret keys between the electronic key 2 and the electronic lock 3 until judgment of the default number of groups of the paired electronic secret keys is satisfied or after judgment of comparing the stored all groups of the paired electronic secret keys, the electronic Lock 3 may perform the corresponding locking operation or unlocking operation.

In the mechanism of verifying the erasing secret key, when the user has the need to modify the electronic secret key of the electronic key 2 or the electronic lock 3, for example, when the slave electronic key 2 is lost or stolen, and the electronic lock 3 may be opened by thieves, modification or deletion of the electronic secret key may be performed at any time. For example, the electronic secret key or the erasing secret key of the electronic lock 3 are reset, the modification or deletion of the pairing setting information of the electronic lock 3 may be carried out after the electronic key 2 with the same erasing secret key is connected. The electronic key 2 and the electronic lock are electrically connected through the first terminal 24 and the second terminal 34. The user may, for example, press a button of the electronic key 2 for a long time to trigger the mechanism of modifying or deleting the electronic lock 3, for example, prompt of light signals of different colors. When the first processing module 22 or the second processing module 32 identifies that the erasing secret keys of the electronic key and the electronic lock 3 are the same, the first processing module 22 or the second processing module 32 deletes or modifies the erasing secret key and the at least one electronic secret key stored in the electronic lock 3. When the erasing secret key and the electronic secret key of the electronic lock 3 are to be modified or deleted, the first processing module 22 and the second processing module 32 communicate with each other through the connection between the first terminal 24 and the second terminal 34, and the first processing module 22 or the second processing module 32 determines whether the erasing secret key stored in the electronic key 2 is the same as the erasing secret key stored in the electronic lock 3. When the erasing secret keys of the electronic key 2 and the electronic lock 3 are the same, the first processing module 22 or the second processing module 32 sends a modification or deletion instruction to modify or delete the erasing secret key and the electronic secret key in the second storage module 33. When the erasing secret keys of the electronic key 2 and the electronic lock 3 are different, no operation is performed. Through the design of the erasing secret key, the authority of modifying or deleting the electronic secret keys of the electronic key 2 and the electronic lock 3 may be effectively managed, and the use of the electronic lock 3 and the electronic key 2 has better security.

In the mechanism of verifying the erasing secret key, after the pairing setting information in the second storage module 33 is deleted or modified, and the electronic lock 3 does not have the setting of the erasing secret key and the electronic secret key, any electronic key 2 may be connected with the electronic lock 3 to perform the pairing setting operation again, and the first processing module 22 or the second processing module 32 generates at least one new electronic secret key, and respectively stores the at least one electronic secret key to the first storage module 23 and the second storage module 33, and then writes the erasing secret key of the electronic key 2 into the second storage module 33 to complete the resetting of the erasing secret key and at least one electronic secret key in the electronic lock 3. By modifying the erasing secret key and the at least one electronic secret key, the security of the electronic lock 3 is enhanced. Even if the electronic key 2 is lost, the pairing setting information of the electronic lock may be replaced immediately to ensure the protection of the electronic lock 3.

Figure 4:
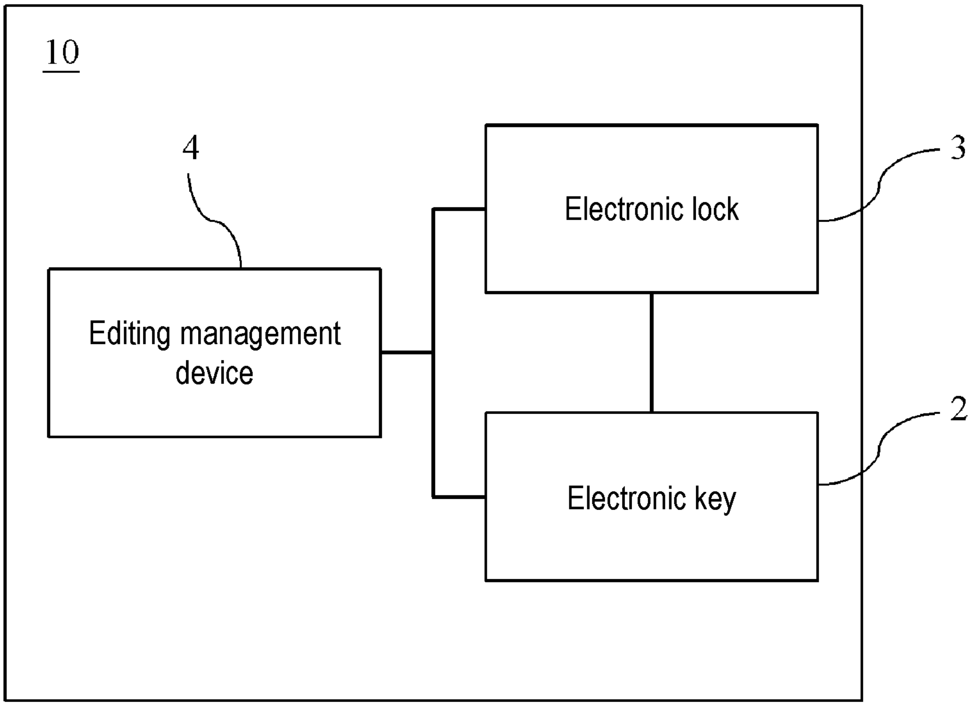
FIG. 4 is a schematic diagram of a system of an electronic lock and an electronic key according to another embodiment of the invention.
Figure 5:
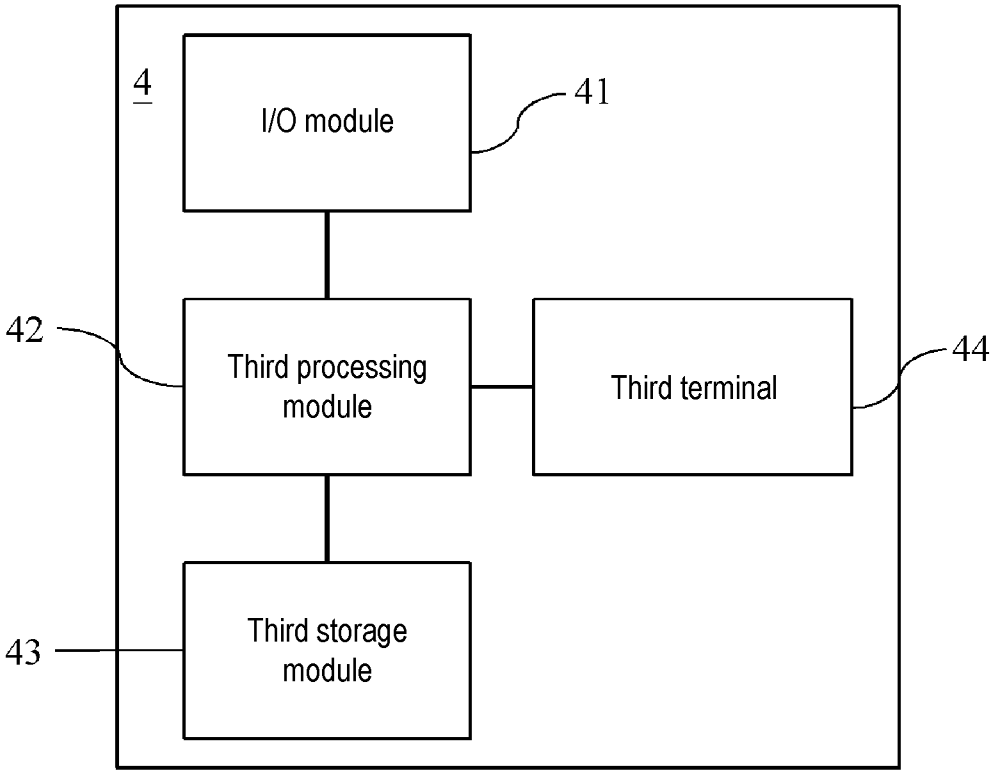
FIG. 5 is a schematic diagram of an editing management device according to another embodiment of the invention.

Referring to FIG. 4, in the mechanism of verifying the erasing secret key, a system of an electronic lock and an electronic key 10 also includes an editing management device 4, which may be a computer or a tablet, etc., and the editing management device 4 is used to set, delete or modify the erasing secret key or the at least one electronic secret key stored in the electronic key 2 or the electronic lock 3, where the editing management device may directly set, delete or modify the erasing secret key or the at least one electronic secret key in the electronic key 2 or the electronic lock 3 according to a selected function, and the editing management device may also set, delete or modify the erasing secret key and the at least one electronic secret key of the electronic key 2 or the electronic lock 3 when matching the erasing secret key that is the same as that of the electronic key 2 or the electronic lock 3. The editing management device 4 is, for example, a computer, a handheld device, or a device with computing power. Referring to FIG. 5, the editing management device 4 includes a third terminal 44, a third processing module 42, a third storage module 43 and an I/O module 41, where the third processing module 42 is connected to a third terminal 44 and a third storage module 43, and the third terminal 44 is used to connect the first terminal 24 or the second terminal 34 and transmit erasing secret key setting information. The third terminal 44 is, for example, a transmission interface of USB, Thunderbolt or RS-232. The third storage module 43 is, for example, a storage device such as a memory or a hard disk. The third processing module 42 is, for example, a central processing unit or a microprocessor.

In the mechanism of verifying the erasing secret key, when the electronic key 2 needs to delete or change the erasing secret key, the editing management device 4 is used to perform the erasing secret key setting operation, i.e., the electronic key 2 and the editing management device 4 are connected through the first terminal 24 and the third terminal 44, so that the first processing module 22 and the third processing module communicate with each other, and the user operates the editing management device 4, for example, the user selects a delete instruction through the I/O module 41, or enters and writes the setting information of the erasing secret key, so that the editing management device 4 deletes the electronic key 2 or changes the erasing secret key or the at least one electronic secret key, and the electronic key 2 returns to an unbinding state or writes a new erasing secret key to complete the erasing secret key setting operation. The first processing module 22 and the third processing module 42 may also delete or change the erasing secret key or the at least one electronic secret key of the electronic key 2 through the mechanism of verifying the erasing secret key, for example, the setting information of the erasing secret key input by the user from the I/O module 41 is compared with the erasing key stored in the first storage module 23, and the input erasing secret key is transmitted between the third processing module 42 and the first processing module 22. By comparing the erasing secret keys through the third processing module 42 or the first processing module 22, when the erasing secret keys are determined to be the same, the first processing module 22 or the third processing module 42 deletes the erasing secret key and all of the electronic secret keys or the at least one electronic secret key bound corresponding to the erasing secret key in the first storage module 23, and then the user inputs a new erasing secret key through the I/O module 41. The third processing module 42 writes the new erasing secret key into the first storage module 23, and uses the new erasing secret key to perform the pairing setting operation on the electronic lock 3. In addition, when the electronic key 2 deletes or changes the erasing secret key, it is necessary to delete the setting information of the same erasing secret key for the bound corresponding electronic lock 3 first, so as to avoid a situation that the electronic key 2 cannot modify the bound corresponding electronic lock 3 after changing the erasing secret key of the electronic key 2.

In the mechanism of verifying the erasing secret key, when the electronic key 2 is lost, the editing management device 4 may also delete or modify the erasing secret key or the at least one electronic secret key of the electronic lock 3, and the editing management device 4 and the electronic lock 3 are connected through the third terminal 44 and the second terminal 34, so that the third processing module 42 and the second processing module 32 communicate with each other, and the user may operate the editing management device 4 to make the editing management device 4 to delete or modify the erasing secret key of the electronic lock 3. The second processing module and the third processing module 42 may only delete or modify the erasing secret key or the at least one electronic secret key of the electronic key 2 through the mechanism of verifying the erasing secret key, for example, the setting information of the erasing secret key input by the user from the I/O module 41 is compared with the erasing secret key stored in the second storage module 33, and the input erasing secret key is transmitted between the third processing module 42 and the second processing module 32. By comparing the erasing secret keys through the third processing module 42 or the second processing module 32, when the erasing secret keys are determined to be the same, the second processing module 32 or the third processing module 42 deletes or modifies the erasing secret key or the at least one electronic secret key in the second storage module 33. In this way, in addition to the electronic key 2, the editing management device 4 may also provide a reset method to the electronic lock 3.

According to the invention, the electronic key 2 and the electronic lock 3 are designed to generate at least one electronic secret key by using a random number through the mechanism of pairing setting operation. Based on the concept that the electronic secret keys between the electronic key 2 and the electronic lock 3 match each other, a conventional complex encryption and decryption process is saved to avoid a plenty of complicated calculations, and a high-performance hardware design and a lot of storage spaces are also saved. The electronic key 2 uses a digitized electronic secret key to replace a conventional physical key, and a memory space size of the first storage module 23 of the electronic key 2 may be designed according to an actual requirement, and the electronic key 2 may store up to hundreds or even thousands of electronic locks 3. Such a large number of electronic locks 3 may be locked or unlocked through only one electronic key 2, and compared with the conventional locks, manufacturing of a large number of keys is saved, and it is avoided to carry a large number of keys, which is more convenient in use, and the hardware cost is significantly reduced.

The electronic key 2 and the electronic lock 3 are physically connected by simple means, and through the at least one electronic secret key generated by random number, the pairing setting information is completed, and there are billions of electronic secret key combinations. According to the law of large numbers, the probability of electronic secret key repetition is very low, and the electronic secret key is still not easy to be cracked by brutal force cracking of computer calculations. The conventional physical key only has hundreds or thousands of combinations, and the structure of the conventional physical key is exposed, it is easy to be copied and cracked. The information transmitted by wireless signals on the market is easy to be intercepted, but the electronic secret key of the invention cannot be peeped and known. In addition, as the electronic key 2 and the electronic lock 3 adopt physical docking to transmit the pairing setting information including the at least one electronic secret key, a chance of being skimmed and cracked is very small, so that the electronic lock 3 of the invention has a relatively high security.

In addition, authority management between the electronic key 2 and the electronic lock 3 of the invention may be implemented through the mechanism of verifying the erasing secret key. When the electronic key 2 has the erasing secret key, the control authority of the corresponding electronic lock 3 bounded to the erasing secret key may be authorized to another electronic key 2, or the setting information stored in the corresponding electronic lock 3 bounded to the erasing secret key may be modified. Since the authorized electronic key 2 does not have the same erasing secret key, the authorized electronic key 2 cannot authorize the control authority of the corresponding electronic lock 3 bound to the same erasing secret key to other electronic keys 2 and the authority of modifying the electronic lock 3. Through the mechanism of verifying the erasing secret key, the control authority of the electronic lock 3 may be effectively managed, which avoids unlimited authorizations to other electronic keys 2 or modification of the setting information of the electronic lock 3, thereby maintaining the control authority of the same erasing secret key between the electronic key 2 and the electronic lock 3.

The lock core module 31 in the electronic lock 3 adopts the design of the SMA unit, where a length of the SMA unit is shortened to pull the latch unit after being heated, which achieves the function of locking or unlocking through a simple structural design. The power source required by the electronic lock 3 is supplied by the electronic key 2, and the electronic lock 3 itself does not need to be supplied with a power source. The structure of the lock core module 31 is quite simple, and has the advantages of low cost and simple production process. The design of the electronic key 2 and the electronic lock 3 of the invention has the advantages of better reliability and excellent success rate.

Finally, it is emphasized that the constituent components disclosed in the aforementioned embodiments of the invention are only for illustration and are not intended to limit the scope of the application. The substitution or change of other equivalent components shall also be covered by the scope of the technical solution of the invention.

What is claimed is:

1. A system of an electronic lock and an electronic key, comprising:

an electronic key, comprising: a first processing module, a first storage module, a power source module, and a first terminal, wherein the first processing module is electrically connected to the first storage module, the power source module, and the first terminal, the first storage module stores an erasing secret key; and an electronic lock, comprising: a second processing module, a second storage module, a lock core module, and a second terminal, wherein the second processing module is electrically connected to the second storage module, the lock core module, and the second terminal, wherein during pairing setting of the electronic key and the electronic lock, the first terminal is electrically connected to the second terminal, the first processing module or the second processing module automatically generates at least one electronic secret key stored in the first storage module and the second storage module, the erasing secret key is copied and stored in the second storage module, so as to complete a pairing setting operation; and during locking or unlocking, the first terminal is electrically connected to the second terminal, and when the first processing module or the second processing module identifies that the at least one electronic secret key stored in the electronic key and the electronic lock are matched with each other, the power source module supplies a power source to the electronic lock being connected to trigger a locking operation or an unlocking operation.

2. The system of an electronic lock and an electronic key as claimed in claim 1, wherein the electronic lock is a shape memory alloy lock, and the lock core module includes a shape memory alloy unit comprising at least one metal alloy having a shape reversibly changeable within a specific temperature range.

3. The system of an electronic lock and an electronic key as claimed in claim 1, wherein the electronic key is adapted to repeatedly perform the pairing setting operation with a plurality of the electronic locks, and store a plurality of the at least one electronic secret key automatically generated during pairing setting with the plurality of electronic locks.

4. The system of an electronic lock and an electronic key as claimed in claim 1, further comprising an editing management device used to set, delete, or modify the erasing secret key or the at least one electronic secret key stored in the electronic key or the electronic lock.

5. The system of an electronic lock and an electronic key as claimed in claim 4, wherein the editing management device has the same erasing secret key as the electronic key or the electronic lock.

6. The system of an electronic lock and an electronic key as claimed in claim 1, wherein the at least one electronic secret key is at least one pair of random numbers.

7. The system of an electronic lock and an electronic key as claimed in claim 1, wherein when the first terminal is electrically connected to the second terminal, and the first processing module or the second processing module identifies that the erasing secret keys of the electronic key and the electronic lock are the same, the first processing module or the second processing module deletes or modifies the erasing secret key and the at least one electronic secret key stored in the electronic lock.

8. The system of an electronic lock and an electronic key as claimed in claim 1, further comprising a slave electronic key, wherein when the electronic key is electrically connected to the slave electronic key, all of or a part of the stored at least one electronic secret key in the electronic key is stored to the slave electronic key.

9. The system of an electronic lock and an electronic key as claimed in claim 1, wherein when the electronic key is also a slave electronic key of another electronic key, only all of or a part of the stored at least one electronic secret key bound corresponding to the erasing secret key in the electronic key is stored to the slave electronic key.

10. The system of an electronic lock and an electronic key as claimed in claim 1, wherein the electronic key further comprises a start button used to wake up the first processing module, and the first processing module enters a sleep state after completing a deletion operation, an erasing secret key setting operation, an authorization operation, the pairing setting operation, the locking operation, or the unlocking operation.

* * * * *